United States Patent [19]

Bell

[11] 4,292,087

[45] Sep. 29, 1981

[54] COATINGS PIGMENTED WITH NONLEAFING ALUMINUM FLAKE

[75] Inventor: Harry E. Bell, East Brunswick, N.J.

[73] Assignee: Alcan Aluminum Corporation, Cleveland, Ohio

[21] Appl. No.: 16,666

[22] Filed: Feb. 28, 1979

[51] Int. Cl.$^3$ .......................... C08K 3/08; C08L 1/18; C08L 67/00
[52] U.S. Cl. ................. 106/193 M; 106/290; 106/308 F; 260/40 R; 260/42.22
[58] Field of Search ............... 106/171, 290, 308 F, 106/193 M, 193 W

[56] References Cited

U.S. PATENT DOCUMENTS

| | | | |
|---|---|---|---|
| 3,389,105 | 6/1968 | Bolger | 106/290 |
| 3,708,318 | 1/1973 | Reinhart et al. | 106/290 |
| 3,781,177 | 12/1973 | Kondis | 427/216 |
| 3,918,984 | 11/1975 | High | 106/290 |

FOREIGN PATENT DOCUMENTS 1140492  1/1969  United Kingdom .

Primary Examiner—Allan Lieberman
Attorney, Agent, or Firm—Cooper, Dunham, Clark, Griffin & Moran

[57] ABSTRACT

Coatings, primarily finish coatings for topical applications, pigmented with substantially nonleafing aluminum flake produced by reducing aluminum to flake form in the presence of a milling agent comprised of isostearic acid, either alone or together with another nonleafing milling agent.

35 Claims, No Drawings

COATINGS PIGMENTED WITH NONLEAFING ALUMINUM FLAKE

BACKGROUND OF THE INVENTION

This invention relates to pigmented coating compositions, such as paints, inks and the like and, more particularly, to coating compositions containing nonleafing aluminum flake pigments.

A coating composition as herein contemplated is a composition that can be applied to a substrate to establish an adherent film thereon, e.g. a protective or decorative finish coating that covers an extended surface area, or a small imprint or marking, e.g. ink. Most coatings comprise a polymeric binder, a pigment if appropriate, and (in the case of liquid coating compositions) a thinner or solvent. Pigmented coating compositions contain a dispersion of a particulate solid pigment in a binder either with or without additional ingredients. The term "vehicle" is used herein to designate material which can be either solid or initially liquid in form, that is inert with respect to the pigment, and (when applied to a substrate surface) forms a substantially continuous surface-adherent coating film that binds and/or holds the dispersed pigment particles. The most commonly used coating compositions are initially in substantially "liquid" form.

Typically, liquid vehicles comprise a mixture of a viscosity-reducing solvent or thinner (either polar, e.g. water, or non-polar, e.g. hydrocarbon) and a film-forming (e.g. polymeric) binder, both of which may themselves be constituted of plural ingredients. As the pigmented liquid composition is applied to a substrate, the solvent or thinner evaporates and/or is absorbed by the substrate and/or polymerizes to form a more or less transparent coating film. The pigment, which remains dispersed in the film, serves to impart properties to the coating composition such as opacity, color, brightness and the like.

The solvent used in application of a particular coating composition will depend primarily on the binder system and the application. For example, hydrocarbon-based solvents find wide application with organic (lipophilic) resin/binders; while water (hydrophilic) based and/or emulsion-forming resins such as latex are used with aqueous solvent systems.

On the other hand, "dry" or powder coatings do not use a liquid vehicle for carrying the binder and/or pigment to the substrate. Powder coatings are of many types having, for example, thermosetting and/or thermoplastic binders including a wide variety of polymeric materials. Epoxy, polyester and like resins can also be applied in dry or powder form, with or without pigment. The powder coatings containing metallic pigment, and especially aluminum powder pigment, are more fully described in Edwards and Wray, *Aluminum Paint and Powder*, 3rd. ed., Reichhold Publishing Co., New York, N.Y. 1955, pp 5-11.

The methods of applying powder or dry pigment vary with the substrate and end use. Spray dispersion with subsequent thermal treatment is most common, but (depending on conductivity of the substrate) electrostatic and fluidized bed methods are also currently in use. Examples of such coatings and their method of application are shown in U.S. Pat. Nos. 4,003,872, 4,205,665 and 3,980,607.

Coating compositions containing metal flake pigments are used to impart a metallic luster to the coated article, whether initially liquid or otherwise. These pigmented compositions find their greatest demand in finish coating for topical applications. Coatings containing aluminum flake pigments are widely used in a myriad of applications. For example, such coatings are used in inks, plastics, paper and fabric finishes, ready-mixed paints, aerosol paints, maintenance and industrial coatings, automobile topcoats and many other applications where a metallic luster is desired. Thus it is known that aluminum flake pigments can be incorporated in a diversity of binder systems, with or without solvents, to provide protective and decorative finish coatings having metallic luster and/or silvery color.

Aluminum flake pigments used in coating materials are generally of two types; "leafing" and "non-leafing". Both "leafing" and "nonleafing" aluminum flake pigments are constituted of minute flakes of aluminum or aluminum-based alloys. The property of "leafing" may be defined as the tendency of metal pigment flakes, when dispersed in a coating composition vehicle (whether or not in the presence of a solvent) having sufficiently high surface tension (and free of substances that inhibit leafing), to become arranged in flat, parallel or overlapping relation at the surface of an applied coating layer of the composition, so as to provide a highly reflective coating that simulates the appearance of bare metal. Thus, leafing aluminum pigments are those in which the proportion of flakes that "leaf" is great enough to produce this visual effect, as is desired for a variety of applications.

Nonleafing aluminum flake pigments, on the other hand, exhibit relatively little or no leafing. These flakes, when dispersed in an applied coating layer, are at least predominantly disposed in random attitudes and at random distances from the coating surface, providing a less reflective coating than a leafing pigmented coating. As explained herein below, the leafing or nonleafing character of a pigment is determined primarily by the method of manufacture of the flake and the use of particular materials in subsequent treatment of the flakes. The extent to which a particular flake material exhibits these characteristics in a coating composition can depend upon the binder and solvent system.

Nonleafing aluminum flake pigments are employed when metallic luster without bare metallic appearance is desired in a coating. In addition, they are especially preferred for thin-coating applications (e.g. of the order of 0.5 mils) and for coatings subject to abrasion and/or weathering which might impair, remove or otherwise move the surface-adjacent array of flakes of a leafing pigment. Notwithstanding the diverse uses of these nonleafing pigment containing coatings, current commercially available compositions are attended with inferior (as regards the nonleafing pigments) or undesirable properties.

The prior art pigmented coating compositions containing nonleafing aluminum flake manifest problems ranging from difficulty in manufacturing the nonleafing flake pigments; to difficulty in dispersing the pigment in liquid vehicles (binder and solvent); to problems with the coating surface finish.

In respect to the production of leafing and nonleafing aluminum flake pigments, both involve the reduction of particulate aluminum (such as foil scrap or atomized aluminum powder) to the desired minute flake form. This is conventionally accomplished by subjecting the particulate aluminum to the action of a ball mill, stamping mill or other equipment capable of flattening and breaking up the particles, in the presence of a minor amount (based on the weight of aluminum) of a so-called milling agent. For convenience of reference, the operation of reducing particulate aluminum to flake form will herein be termed "milling," and the equipment in which it is performed will be termed a "mill," regardless of the specific nature of the operation and equipment used. Milling may be performed either dry (in air or other gas) or wet (in a liquid wet-milling vehicle such as mineral spirits). After milling, the flake particles may in some instances be subjected to various additional treatment.

Presence of the milling agent in the milling operation is essential to protect the aluminum particles during reduction so that they are flattened into flake form rather than being merely broken up, and to prevent cold welding of the particles. In addition, the milling agent covers the particle surfaces with a thin layer of material which remains on the particles after milling, protecting them from corrosion, oxidation or other deleterious attack so as to aid in preserving the brightness or luster of the produced pigment. The protective coating layer also reduces the hazard of fire or explosion incident to handling aluminum powder. The material of this layer is herein termed "milling agent residue" because it consists essentially of the milling agent compound, compounds present during milling and/or derivatives thereof produced by reaction in the course of or as a consequence of the milling operation. It is believed that some milling agent residue of the described layer may be chemically bonded at the flake surfaces. In any event, some of the layer of residue is in direct contact with elemental metal at the flake surfaces, whether or not such contact involves chemical bonding, because the milling agent is present at the time the elemental metal is exposed at these surfaces by milling.

Leafing aluminum flake pigments are made by using as the milling agent, one or more substances herein termed "leafing milling agents" which are known to impart leafing properties to the flakes. Currently used leafing milling agents enable milling to be performed with high efficiency. The desired sizing of leafing flake pigments thus produced is readily controllable, for example, by variation in resident time of the charge of aluminum in the mill. Consequently, the manipulative operations involved in making leafing aluminum flakes are advantageously simple, straightforward and convenient. These manipulative operations (apart from the specific milling agent employed) will be termed "leaf milling" herein. It will be understood that the term "leaf milling" designates that milling operation (whether in a ball mill or other equipment) which, if performed in the presence of a leafing milling agent such as stearic acid, would result in production of a leafing flake pigment.

The methods heretofore known for production of nonleafing aluminum flake pigment are not comparably facile or effective when compared to leaf milling techniques. Likewise the nonleafing pigment product (either because of or in spite of these production methods) is attendant with problems not present in utilizing leafing flaked material. In one of the production procedures, known as chemical deleafing, particulate aluminum is first milled in the presence of a leafing milling agent such as stearic and/or palmitic acid. The resultant flakes are then treated with deleafing agents such as lead napthenate or octoate, aqueous phosphates or acetic acid. Another procedure involves using a nonleafing milling agent, typically an unsaturated acid such as oleic acid, in the milling operation, instead of a leafing milling agent. Chemical deleafing is disadvantageous from the standpoint of operational convenience, because it requires an extra, deleafing step after milling. Additionally, the deleafing agents, which remain in the product, are considered undesirable contaminants or pollutants in at least some coating applications.

Use of known nonleafing milling agents, in particular oleic acid, also presents serious drawbacks, because, while these agents produce a nonleafing product in a single step, their effectiveness as milling agents is poor. Consequently, milling times must be short, as compared with leaf milling (to avoid product degradation) and production efficiency is very low. The milled metal commonly contains high levels of oversized particles, amounting sometimes to as much as 30% of the total feed and necessitating successive screenings to obtain a properly sized pigment. Remilling of the oversized particles is even less efficient. Use of oleic acid also results in lower extent of protective covering of the flakes than is provided by leafing milling agents. Consequently the hazard of explosion is increased, preventing production of dry pigments and making more difficult the attainment of very fine particle size grades.

Currently commercially available nonleafing aluminum flake pigments, as produced by the abovedescribed procedures, have substantial shortcomings tending to impair the quality of coating compositions (both in the liquid vehicle and as a finish) in which they are incorporated. Coating compositions containing pigments produced with an oleic acid milling agent tend to form insoluble agglomerates upon standing for any length of time (whether a liquid solvent-binder system or otherwise). Thus, the applied coating tends to exhibit an undesired graininess. Progressive agglomeration often renders the coating composition virtually unusable (not able of standard application) after relatively short periods of storage. Additives used to inhibit agglomeration, even when effective, are known to have adverse effects. Finish coatings containing chemically deleafed pigments (even if not agglomerated) are dull and relatively unattractive (possibly due in some respect to etching of the flake surfaces by the deleafing agent). Moreover, nonleafing pigment containing coating compositions are known to lack desirable product characteristics such as tinting strength, opacity and luster. As a result, excess pigment is required to give the coating the required hiding strength. This excess, in turn, causes dullness of the finish luster.

Alternative proposals for production of nonleafing aluminum flake pigments have been set forth in U.S. Pat. Nos. 2,858,230 (treatment of leafing pigment with an aqueous solution containing available $PO_4$ ion), 3,264,129 (use of certain aliphatic amines as milling agents), and 3,389,105 (use of fluorocarbon resins as milling agents). These proposals, however, have not found commercial acceptance as ways to ovecome the problems associated with current nonleafing aluminum flake pigments and their manufacture.

Thus it can be seen that coating compositions containing nonleafing aluminum flake pigments, while highly desirable in finish coatings which are subject to abrasion and/or weathering are frought with problems not easily solved by a mere variance of parameters such as ingredients, method of application or the like. For example, in the manufacture of the nonleafing pigment material, short milling times give more uniform reduction of product but multiple screenings are required to provide an acceptable pigment material. Further, in order to alleviate seediness in the finish, screening through a 400 mesh (Tyler) sieve is often required to provide a finish having sufficient luster and depth. However, the finer screening accelerates agglomeration of the nonleafing pigment material in the liquid vehicle which requires expensive application methods, e.g. continual mechanical manipulation of the liquid material to be applied. Stabilizer and anti-agglomerating agents are necessary to give the liquid coating product an acceptable shelf life. These additives, however, are deleterious to certain properties of the coating finish.

Further, to overcome the "seediness" or grainy appearance of finishes containing standard nonleafing aluminum pigment, thicker coatings must be applied. This not only leads to undue expense, but also produces undesirable characteristics in the coating finish. Additional disadvantages of the prior art coatings are manifested in tinting strength (hue produced by a given volume of pigment in a coating), opacity (hiding ability of a given volume of pigment), metallic luster or brightness, and flop (change in hue or lightness with change in viewing angle).

Finally, because of the tendency to agglomerate (especially in the finer grain pigment liquid coating material), the hiding power (opacity) of prior art pigmented coatings is reduced requiring an additional amount of nonleafing pigment material. Generally, the amount of aluminum used per volume of liquid vehicle varies, but excess amounts of pigment tend to dull the gloss of the finish as well as affect the application characteristics of the coating composition. Excess pigment can result in a film disfigurement known as mottling, flocking or flooding. This is due partly to the pigment flake size and partly to the nature of certain binder materials which tend to form migrated colonies of pigment.

Thus a pigmented coating composition (and especially liquid coatings) containing nonleafing aluminum flake that is easy to apply, does not agglomerate upon standing (without the use of stabilizer, etc.) and produces a smooth, non-grainy finish when applied to a substrate would be desirable. Additionally, it would be advantageous if the method of producing the nonleafing aluminum pigment material of the coating composition were as economical and facile as that of producing leafing flake material. It would be of further advantage if the nonleafing aluminum pigment material could be supplied to the liquid vehicle as a dry powder rather than as a paste, since the mineral spirit vehicle could be deleterious to the liquid coating composition and/or the finish coating composition.

U.S. Pat. No. 3,781,177 teaches that admixture of isostearic acid with previously milled aluminum flake powder (either leafing or nonleafing, i.e. presumably already bearing a layer of milling agent residue) agglomerates and thereby dedusts the powder for explosive use.

SUMMARY OF THE INVENTION

It has now been unexpectedly discovered that a nonleafing aluminum pigmented coating composition characterized by advantageously high opacity, consistent tinting strength, and freedom from undue flop and graininess, can be provided by pigmenting a standard coating composition (powdered or liquid) with an aluminum flake pigment produced by leaf-milling in the presence of milling agent comprising isostearic acid, either alone or together with other nonleafing milling agents. Thus the instant invention broadly contemplates a pigmented coating composition wherein the pigment is comprised of at least substantially nonleafing aluminum flake particles having a surface layer of an isostearic acid milling agent residue.

In a preferred embodiment, nonleafing aluminum flake pigmented liquid coating compositions for topical application contain a pigment material comprised of an aluminum flake pigment obtained by leafmilling particulate aluminum to flake form in the presence of an amount of isostearic acid effective to act as a milling agent, i.e. to perform the functions of a milling agent in promoting the reduction of the aluminum particles to flake form and a second nonleafing milling agent in an amount effective to reduce residual leafing.

In one embodiment, the coating composition is in liquid form suitable for application to a substrate and consists essentially of a liquid, comprised of a binder and a solvent, and a pigmenting material comprised of nonleafing aluminum flake particles having a layer of isostearic acid milling agent residue thereon. In another embodiment, the coating composition forms a finish surface of a substrate, i.e. the nonleafing aluminum flake pigment is dispersed in the binder which has undergone a reaction, whether thermal, chemical or otherwise, e.g. solvent evaporation, polymerization or the like, to produce a finish (cured, dried surface coating) on a substrate.

In a greatly preferred embodiment, the nonleafing aluminum flake particles having a layer of isostearic acid milling agent residue are delivered to and admixed with the binder in "dry" form, (whether the binder is liquid or otherwise). That is, the nonleafing aluminum flake particles are delivered to the coating in the substantial absence of mineral spirits ("wet" milling vehicle). This is particularly preferred for powder coating.

DETAILED DESCRIPTION OF THE INVENTION

Further features and advantages of the invention will be apparent from the detailed description hereinbelow set forth.

According to the present inventive concept, a coating composition is pigmented with the nonleafing aluminum flake pigment either alone or in combination with other pigments in amounts effective to pigment the finish surface for the purpose of its intended use. Thus, for example, an embodiment of the composition of the invention can be essentially identical to any known or conventional nonleafing aluminum flake pigmented coating composition, with respect to the vehicle employed, other ingredients (if present), and relative proportions of pigment and vehicle, except that in accordance with the invention, the aluminum flake pigment incorporated in the composition is a pigment produced by milling particulate aluminum in the presence of a milling agent comprising isostearic acid (with or without other, nonleafing milling agents) such that the pigment particles bear a surface layer of the isostearic acid milling agent residue.

The preferred coating composition vehicle of the instant invention, at the time of application, comprises a film forming binder, and a volatile thinner (solvent). Each ingredient in and of itself can constitute a complicated admixture of one or more constituents. The binders that can be used in accordance with the instant invention include various organic film formers and mixtures thereof. The only requisite is that the binder (as part of the liquid vehicle) be non-deleterious to the pigment material. Examples of suitable binders include alkyd resins and cellulose lacquers.

Particularly desirable effects are obtained with those types of binders which are somewhat transparent and simultaneously clean and bright rather than dull and milky. Such coatings are transparent to a degree that they are at least partially translucent and therefore have a desirable depth due to the film forming material and the luster or metallic appearance of the metal particles which may be modified by use of auxiliary colors or pigments.

Solvents that can be used in accordance with the instant invention (when a liquid vehicle is specified) are the aromatic and aliphatic hydrocarbon mixtures well known in the art as solvents (and cosolvents). Although aliphatic solvents are preferred, the instant invention contemplates the use of more polar (hydrophilic) solvents which may be used with, for example, latex binders.

Preferred solvents are the broad classes of aliphatic aromatic and chlorinated hydrocarbons, including alcohols, ketones, and glycol ethers. It will be realized that any thinner (solvent) non-deleterious to the coating composition may be used. The exact solvent (and cosolvent) admixture will depend upon the nature of the resin (binder), application techniques, evaporation, rate of volatility, sprayability, flow, leveling, bubbling, pinholding, and the like. Another consideration is blush resistance. Blushing occurs in nitrocellulose lacquer due to the condensation of moisture as the temperature is lowered by rapidly evaporating the solvent, especially in spray applications.

Thus, any of a great variety of binder-solvent systems can be employed as vehicles in embodiments of the present invention, for provision of a corresponding variety of coating compositions having widely diverse uses. Preferably, the binder is a polymeric film-forming material, for example a resin or combination of resins such as alkyd, acrylic, thermoacrylic, vinyl, lacquer or silicone, and the solvent is one or a combination of compatible organic solvents or thinners such as xylene, toluene, methyl ethyl ketone, etc.

The choice and formulation of binder-solvent systems for particular purposes, as well as the appropriate relative proportions of aluminum pigment and vehicle (and the selection and proportions of other ingredients, if any) in any given instance, may, as stated, be wholly conventional and will therefore be readily apparent to those of ordinary skill in the art of aluminum pigmented coatings.

The pigment of the inventive coating composition is prepared by reducing aluminum to flake form in the presence of an amount of a milling agent effective to reduce the aluminum wherein the milling agent comprises isostearic acid either alone or together with an amount of a conventional nonleafing agent, e.g. oleic acid, effective to reduce residual leafing effects.

The starting material used to produce the pigment of the inventive coating composition is particulate aluminum (and alloys) in any suitable form such as foil scrap, atomized aluminum powder, or other aluminum particles. The use of atomized powder is at present preferred as especially convenient. This starting material or virgin aluminum charge can be in all respects essentially identical to the virgin aluminum charge conventionally employed in present-day commercial procedures for making leafing aluminum flake pigments by leaf-milling in the presence of a leafing milling agent.

Isostearic acid useful herein is the same as in the aforementioned U.S. Pat. No. 3,781,177. As there stated, the term "isostearic acid" is not intended to be restricted to its literal translation of 16-methylheptadecanoic acid but rather is intended in its more common meaning in this case for mixtures of $C_{18}$ saturated fatty acids of the general formula $C_{17}H_{35}COOH$. These are rather complex mixtures of isomers, liquid at room temperature and primarily of the methyl-branched series, which are mutually soluble and virtually inseparable. While most of the branched chains contain a total of eighteen carbon atoms, not necessarily all of the molecules contain exactly that number. The branch is primarily methyl but may possibly include some ethyl and the distribution is typically primarily towards the center of the chain but is fairly random. Methods pertaining to the production of isostearic acid are described in U.S. Pat. 2,664,429 and U.S. Pat. 2,812,342. One source of isostearic acid suitable for use in making the present pigment is marketed commercially by Emery Industries, Inc. under the trade names Emery® 871 and Emery® 875 Isostearic Acid. Typical characteristics of the Emery® 871 acid are listed in the following table:

Titer, °C. max.: 10
Iodine value, max.: 10
Free fatty acid, % (as oleic): 88
Acid value: 175
Saponification value, min.: 180
Molecular weight (approx.): 284
Refractive index, 25° C.: 1.4603
Viscosity, cps., 25° C.: 48

In preferred embodiments of the invention, the pigment is produced using a milling agent that further comprises an amount of another, nonleafing milling agent, together with the isostearic acid, effective in reducing residual leafing. Surprisingly, use of this amount of the conventional nonleafing milling material does not result in agglomeration, graininess or other undesirable characteristics of the prior art nonleafing flake material. Suitable substances for use as such other milling agents are substances heretofore conventionally used as nonleafing milling agents in the production of nonleafing aluminum flake pigments, for example unsaturated fatty acids such as oleic, linolic and ricinoleic acid. Oleic acid is at present especially preferred.

The relative proportions of milling agent and virgin aluminum charge used in producing the pigment employed in the invention are such that the total weight of milling agent (including isostearic acid) present during milling is equal to a minor percentage of the weight of aluminum present during milling, and is an amount effective to act as a milling agent for that weight of aluminum in promoting reduction of the particulate aluminum to flakes. It is preferred that the weight of isostearic acid employed be equal to between about 3% and about 7% (very preferably between about 4% and about 5%) of the weight of the virgin aluminum charge, and that the weight of other nonleafing milling agent (if used) be equal to between about 1.5% and about 3% (very preferably between about 2% and about 3%) of the weight of the virgin aluminum charge.

The milling step is performed in a mill of any type (for example, such as a ball mill or stamping mill) suitable for performance of a conventional leaf-milling operation to reduce particulate aluminum to flake form in the presence of a leafing milling agent. Such mills are entirely conventional in structure and operation, and, being well known to those of ordinary skill in the art, need not be further described. This milling step can be performed either as a dry-milling operation (with only the milling agent present), or as a wet-milling operation using any liquid wet-milling vehicle that is essentially inert with respect to the aluminum charge and the milling agent; suitable liquids for this purpose include conventional wet-milling vehicles such as mineral spirits, e.g. blends of aliphatic hydrocarbons which can contain aromatic hydrocarbons as well as naphtha.

In producing the pigment employed in the invention, the virgin aluminum charge, isostearic acid, other nonleafing milling agent (if used), and wet-milling vehicle (if used) are supplied to a suitable mill as defined above, and the mill is operated for a period of time sufficient to reduce the supplied aluminum of the charge to flake form, with concomitant reduction in particle size of the aluminum to a desired maximum value.

All aspects and features of performance of this milling operation can be in conformity with standard or conventional leaf milling techniques (i.e. as heretofore known and used to produce leafing aluminum flake pigments) except that the milling agent used in the present instance comprises isostearic acid (alone, or together with another nonleafing milling agent) rather than a leafing milling agent. Thus, the selection of the virgin charge, milling apparatus, wet or dry milling condition, duration of milling, final particle size distribution (as well as the ratio of ball charge to virgin aluminum charge, and ball size distribution, when a ball mill is employed) and other conditions are all in accordance with conventional leaf-milling (as exemplified, for instance, by the procedures described in U.S. Pat. No. 3,776,473 and references cited therein). In the present instance, however, the material supplied to the mill is essentially free of any leafing-type milling agent but includes at least an effective amount of isostearic acid instead. That is to say, to produce the present pigment, a virgin charge of particulate aluminum is subjected to a leaf-milling operation that is entirely conventional except for the milling agent used.

At the end of the milling time, the milled flake pigment is discharged from the mill, as a dry particulate if dry milling has been performed, or (when wet milling is employed) in a mixture with the liquid wet-milling vehicle. This product is a pigment having, on the pigment particles, a surface layer of the milling agent residue which results from milling particulate aluminum to flake form in the presence of a milling agent comprising isostearic acid.

The following explanation is set forth for clarity and is not meant as a limitation. It is believed that the milling agent residue is a limited reaction product, i.e. a product of partial chemical reaction of the milling agent in the presence of aluminum under milling conditions. The layer apparently comprises isostearic acid which has been modified by subjection to the conditions of milling and is in direct contact with elemental aluminum exposed at the flake surfaces by the milling operation. If a nonleafing milling agent is also present during milling, the layer additionally includes residue of such other agent in a complex admixture/reaction product. In any event, merely admixing a pigment flake (leafing or nonleafing) produced in accordance with conventional methods with isostearic acid will not effect the nonleafing aluminum flake pigment of the present inventive coating composition.

The product of the above described process is a nonleafing aluminum flake pigment, which is significantly brighter than typical nonleafing aluminum flake pigments produced by conventional deleafing techniques, yet which does not exhibit the tendency to agglomerate characteristic of nonleafing aluminum flake pigments produced by milling with a conventional nonleafing milling agent such as oleic acid. Presence of oleic acid or other nonleafing milling agent together with isostearic acid, in producing pigments used in preferred embodiments of the invention, overcomes any residual leafing tendency which may be exhibited by aluminum flake pigments produced with isostearic acid alone. In proportions within the above-stated preferred range, the oleic acid or other nonleafing agent does not cause undesired agglomeration of the pigment even after prolonged storage.

One advantage of the pigments employed in the present invention, as compared to pigments made with only a conventional unsaturated fatty acid nonleafing milling agent, is that they may readily and safely be provided as dry pigments for mixture with vehicles with which presscake carriers would be deleterious.

The liquid coating composition of the instant invention is thus easily produced by dispersing, in any vehicle heretofore conventionally employed with a nonleafing aluminum flake pigment (or indeed any other vehicle inert with respect to the aluminum pigment), the above described aluminum flake pigment wherein the flake particles have a surface layer of isostearic acid milling agent residue. The relative proportions of pigment and vehicle (and other ingredients if any) thus mixed may be entirely conventional for aluminum flake pigmentation of the particular vehicle used. Similarly, the dispersing procedure may in itself be wholly conventional (apart from the nature of the pigment thus dispersed). In general, the aluminum flake pigment, either "wet" (in a presscake with a carrier such as mineral spirits) or "dry" (in powder form), is added last to the composition, to minimize the extent of mixing and consequent flake degradation.

After the pigment is dispersed in the liquid vehicle to constitute a composition embodying the invention, a coating thereof is produced on a substrate surface by applying a layer of the composition (with the pigment-containing vehicle still liquid) in a suitable manner, as by brushing, spraying, or printing, to all or a portion of the substrate surface, and causing or allowing the solvent or thinner to evaporate. The binder dries, hardens and/or polymerizes to form a dry surface-adherent coating film, typically at least somewhat transparent, which entraps and holds the aluminum flake pigment particles in random disposition and orientation relative to the film surface as desired to impart to the coating the visual effects of a nonleafing pigment.

Thus the composition of the invention provides paint, ink, and other coatings characterized by deep metallic luster, in contrast to coatings using the unsatisfactorily dull previously known nonleafing aluminum flake pigments produced by milling particulate aluminum with a leafing-type milling agent and then deleafing the flake. Additionally, coatings in accordance with the invention are advantageously free of graininess, owing to the pigments' freedom from the tendency to agglomerate within the liquid vehicles, which agglomeration characterizes the previously known nonleafing aluminum flake pigments produced by milling with a nonleafing milling agent such as oleic acid. In those embodiments of the present process which utilize a small amount of oleic acid and/or other nonleafing milling agent in conjunction with the isostearic acid, the other agent further enhances the nonleafing characteristics of the pigment product, yet does not cause agglomeration.

A further particular advantage of the pigment of the coatings in the instant invention is that, while it is a bright nonleafing pigment, it also contains a high level of protective coverage on the flake particles. Whereas conventional milling utilizing nonleafing milling agents is known to be hazardous (especially when producing very fine grades of such product), the flake pigment of the instant invention may be handled without substantial risk of fires and/or explosions. Moreover, the high level of protective coverage of the flakes afforded by the isostearic acid milling agent residue enables safe provision of the pigment as a dry, powderlike product for dispersion in the liquid vehicle.

A still further advantage of the instant coating composition is that particle size distribution of the pigment exhibits little variation from one batch to another. Hence greater consistency in product properties is achieved than has heretofore been possible without extensive reprocessing to obtain proper particle size distributions.

When the pigment is to be provided to the coating composition in "paste" form, the pigment is delivered from the mill in mixture with the liquid wet-milling vehicles used. The mixture (after screening or sizing as described above) is filtered to remove excess liquid vehicle and thereby to form a paste or so-called presscake of the pigment. The metal (nonvolatiles) content of the presscake is preferably adjusted to a conventional value in a range of about 60 to about 75 (preferably about 65 to about 72) percent by weight, typically by mixing the cake with a suitable conventional carrier liquid such as mineral spirits.

In accordance with the instant invention, the pigment is preferably provided to the vehicle in "dry" (powderlike) form to avoid the deleterious effects of the wet milling vehicle (mineral spirits). This "dry" powderlike pigment product is especially preferred where the pigment is intended for use in a powder coating or in a coating (e.g. paint or ink) vehicle in which the carrier liquid would have adverse effects. Consequently, the filtered presscake is treated to remove the volatiles content (wet-milling vehicle) as by vacuum, with or without heating, in order to provide the pigment in the desired dry powder condition. Of course, if the milling step is performed as a drymilling operation, the pigment as delivered from the mill is already dry, there being no liquid vehicle in the mill. In either case, provision of a dry product is accomplished without undue hazard owing, as stated above, to the protection afforded by the layer of isostearic acid milling agent residue on the milled flakes. It will be understood that the flakes of the "dry" product also retain this coating.

It is sometimes desired to add an antipyrophoric and dispersing agent to the nonleafing pigment after milling is complete. The agent may, for example, be lauric acid or other saturated fatty acid (even an acid that would act as a leafing milling agent if present during leaf milling) which may be added after the milling step, preferably after screening during the adjustment of the nonvolatiles content. The preferred amount of such agent ranges from about 1½ to about 3 wt % based upon the metal content with the preferable amount being about 2% by weight. It should be noted that if lauric acid is added during milling, it has been found that some leafing results in the flake product, but the post-milling addition of lauric acid does not cause leafing to occur.

An illustration of production of the pigment used in the coating material of the instant invention incorporates the preferred features noted above. The pigment is produced by feeding, to a ball mill of a type (and containing a charge of balls) heretofore conventionally used to produce leafing aluminum flake pigments, a quantity of atomized aluminum powder and isostearic acid and oleic acid in proportions (relative to the weight of aluminum) within the preferred ranges specified above. The milling is accomplished in the presence of mineral spirits (as a liquid wet-milling vehicle), the relative proportions of ball charge, aluminum and mineral spirits in the mill conforming to conventional leaf-milling practice. Milling of the aluminum (by operating the ball mill in conventional manner) is for a period of time (as well known in the leaf milling art) effective to produce a desired particle size grade of pigment. The produced flake is discharged from the mill, in mixture with mineral spirits, then is sized by screening. The mineral spirits are removed by vacuum to obtain a dry powder pigment product. The pigment thus produced, whether provided as a dry powder or as a presscake, is capable of prolonged storage without agglomeration or other deterioration. This is particularly advantageous for use in powder coating applications.

As stated above, in the practice of the present invention this powder or presscake is dispersed in a coating (e.g. paint or ink) vehicle comprising a film-forming binder (and a solvent or thinner), which is applied (i.e. with the pigment dispersed therein) to a surface to be coated. Typically the amount of pigment used, in parts by weight, is less than the amount of vehicle (liquid or otherwise) in which it is dispersed. In performance tests on coating products of the invention, it has been found that the use of fine pigments (made with isostearic acid as a milling agent) in otherwise standard commercial coating compositions results in a bright, silvery appearance of such opacity that the amount of pigment can be substantially reduced (as compared with prior nonleafing aluminum flake pigments) to achieve a given desired visual effect thus affording significant savings. The hiding and tinting characteristics of the dispersed nonleafing aluminum pigments in coating compositions according to this invention are equivalent to, or better than, those of present-day commercially available materials.

While the instant invention has been described particularly with respect to more conventional liquid vehicle systems, it will be realized that known dry or powder systems using nonleafing aluminum flake pigment (or those that could be adapted to do so) are equally within the scope of the inventive concept. The particular system (liquid or dry), the binder, the solvent and the like can be chosen by the artisan to accomplish a particular purpose.

By way of further illustration of the invention, reference may be made to the following specific examples:

In the following examples, various methods were used to identify and evaluate specific characteristics of the pigments used in the inventive coating and/or of the coating compositions of the instant invention.

Leafing Characteristics

One or more of the following tests were performed to determine leafing characteristics.

ASTM D480—In accordance with this test the indicated flake pigment sample is subjected to procedures incorporated in ASTM designation D480-70 as reapproved in 1976 to determine the leafing characteristics. The results are given in % of leafing.

Mineral Spirits—In accordance with this test a sample portion of the flake pigment is placed in an appropriate vessel and mineral spirit solvent is added with stirring. Leafing is indicated by observing the presence of a shiny (silvery) film on the surface of the mixture. (Usually used with ASTM D480).

Xylene—In accordance with this test a sample portion of the flake is placed in an appropriate vessel and xylene solvent added with stirring. Leafing is indicated by observing the presence of a shiny (silvery) film on the surface of the mixture. (Usually used with ASTM D480).

Gray Enamel Sprayout

In this test, sample panels are prepared in accordance with the following procedure. A coating composition is prepared by mixing the indicated pigment (in paste form) with toluene and a specified amine accelerator. A 4" by 6" mil steel panel electrolytically plated with tin (conforming to Federal Test Standard 141, Method 2012) is rubbed with a grit cloth until the full surface has been sanded. Using a lintfree towel, the sanded surface is cleaned with a solvent (e.g. toluene or lacquer thinner).

The coating composition is applied to the prepared panel using a standard spray gun, such as the Type MBC spray gun manufactured by The deVilbiss Company, set at 50 lb. gun pressure (one full turn on the fluid screw). With the gun held perpendicular to the surface approximately 8 to 12 inches from the surface, three alternate, overlapping right and left passes are sprayed. The panel is then inverted and sprayed three more overlapping passes. Each pass is started off the panel and the trigger of the spray gun pulled when the gun is opposite the edge of the panel. The trigger is released at the other edge of the panel but the stroking motion is continued for a few inches to assure a smooth, full, wet coating without sags. Then panels are then dried, either in air or in a low temperature oven.

The sample panels are then tested for gloss and total reflectance as follows in accordance with standard practices.

Gloss—In taking gloss readings, a meter with a 60° gloss head is standardized using highly polished black glass such as onyx or carraren. Gloss values are determined accordingly.

Total Reflectance—Total reflectance is determined by use of a reflectometer comprised of an integrating sphere coated with a reflecting medium such as MgO in $CACO_3$, a photo detector and a meter. A light source is directed upon the wall of the coated sphere and the meter is adjusted to 100% (a perfect mirror would theoretically reflect 100% of light directed on its surface). In the test situation, the panel to be tested is substituted for the coated sphere and the percent reflectance guaged by the meter.

Thin Coat Gray Enamel Sprayout

In this test sample panels are prepared using the apparatus and procedures described in the Gray Enamel Sprayout test. The coating admixture used in the Gray Enamel Sprayout is thinned with toluene (two parts by weight of coating to one part by weight of toluene) and applied to the prepared panel with the spray gun set at 50 lb. gun pressure ($\frac{1}{2}$ turn on the fluid screw). The same spraying technique as described in the Gray Enamel Sprayout test is used except that only three alternate, overlapping left and right passes are made. The panels are then dried and observed by naked eye for seediness and/or graininess and agglomerated appearance of the coating.

Nitrocellulose Lacquer Drawdown

In this test a mixture comprised of a metal flake pigment sample, a thinner (e.g. T28 sold by Sterling Lacquer Mfg. Co.) and a nitrocellulose lacquer base (e.g. Sterling Lacquer No. 1088 sold by Sterling Lacquer Mfg. Co.) is poured onto white, 70# litho paper in sufficient quantity to form a one inch in diameter portion of mixture. The paper is then drawn between a base plate and a spreading bar to distribute the mixture on the paper. The paper containing the distributed mixture is then placed in a 65° C. oven for one minute to expedite drying. The dried sample is then tested for gloss and total reflectance using the standard procedures described in the Gray Enamel Sprayout test.

EXAMPLE I

A laboratory size ball mill, three feet in diameter and one foot in length, containing 600 pounds of milling balls was charged with the following:

| | |
|---|---|
| atomized aluminum powder (lbs) | 9.5 |
| isostearic acid* (g) | 195 |
| mineral spirits** (gal) | 2.4 |

*Emery ® 875 sold by Emery Industries, Inc., Cincinnati, OH
**Amsco ® Mineral Spirits 75 sold by Union Oil Co. of California The mill was activated and run for three hours at 44 rpm. The resultant product was screened through a 325-mesh Tyler screen to produce an extra fine grade pigment. The presscake weighed about eleven pounds (at 71.52% nonvolatiles level) representing a yield of 83.67%. A one pound sample of the presscake material was adjusted with mineral spirits to about 65% nonvolatiles to establish a commercially standard formulation for testing.

The resultant product showed the following characteristics after being subjected to the indicated test:

Leafing Characteristic
  ASTM D480 18%
Nitrocellulose Lacquer Drawdowns
  Gloss: 60° = 30
  Total Reflectance: 60
Gray Enamel Sprayouts
  Gloss: 60° = 38
  Total Reflectance = 100
Thin Coat Gray Enamel Sprayout
  The dried finish had a nonagglomerated, nongrainy appearance.

EXAMPLE II

This example shows the use of an amount of a second nonleafing milling agent (oleic acid) effective in reducing residual leafing. Using the equipment operated under the conditions of Example I, the ball mill was charged with the following:

| | |
|---|---|
| atomized aluminum powder (lbs.) | 9.5 |
| isostearic acid* (g) | 195 |
| oleic acid** (g) | 129 |
| mineral spirits*** (gal.) | 2.4 |

*Emery ® 871 sold by Emery Industries, Inc., Cincinnati, OH
**Neofat ® 9404 sold by Armak Industrial Chemicals Div., Chicago, Illinois
Amsco ® Mineral Spirits 75 sold by Union Oil Co. of California The amount of presscake obtained was 11 pounds, representing a yield of 84.75% (at 75.18% nonvolatiles level). A one pound sample of the presscake material was adjusted with mineral spirits to about 65% nonvolatiles to establish a commercially standard formulation for testing. The mineral spirit solvent contained 3% stabilizer (Santicizer ® 148 sold by Monsanto) based on the metal content.

The one pound sample thus adjusted was screened through a 325 mesh Tyler sieve. At a nonvolatile content of 64.72% only 0.03% by weight of the original sample remained on top of the sieve. No rescreening was deemed necessary. The resultant product showed the following characteristics after being subjected to the indicated test:
 Leafing Characteristics
  ASTM D480: not deemed necessary
  mineral spirits: none
  xylene: trace
 Nitrocellulose Lacquer Drawdowns
  Gloss, 60° = 30
  Total reflectance = 60
 Gray Enamel Sprayouts
  Gloss, 60° = 38
  Total reflectance = 102
 Thin Coat Gray Enamel Sprayout
  The dried finish had a nonagglomerated, nongrainy appearance.

The remainder of the eleven pound presscake (without stabilizer) was stored in a loosely sealed pail for eight months. Upon examination it was found substantially agglomeration free. This is in contrast with prior art nonleafing pigment milled in the presence of oleic acid milling agent which is found to agglomerate, in the absence of stabilizer, in about twenty-four hours.

Examples I and II show a superior, substantially nonleafing flake pigment product which is used to pigment the coating compositions of the instant invention.

EXAMPLE III

In this example commercial grade extra fine, medium fine and medium nonleafing pastes were prepared utilizing standard leaf-milling methods but with the use of an isostearic acid milling agent.

Two identical mill runs were used to produce extra fine nonleafing paste. To a commercial ball mill containing 30,000 pound ball charge of standard mix, having an average diameter of about 5/16 inch, for leaf-milling atomized aluminum powder was added:

| | |
|---|---|
| atomized aluminum powder (lb.) | 950 |
| isostearic acid* (lb.) | 42 |
| unsaturated oleic acid** (lb.) | 27 |
| mineral spirits*** (gal.) | 126 |

*Emery ® 871 sold by Emery Industries, Inc. Cincinnati, OH
**Neofat ® 9404 Division, by Armak Industrial Chemicals Division, Chicago, Illinois
***Amsco ® Mineral Spirits 75 sold by Union Oil Company of California The mill was activated and operated for 6½ hours and 31 rpm for each run. In each case the resultant product was screened through a 250-mesh Tyler sieve with virtually no perceivable oversized product.

After filtering, the presscake from the two runs was combined and adjusted to about 65% nonvolatile with mineral spirits. Two percent lauric acid by weight based on the metal content, was added to prepare a pigment in paste form to enhance dispersibility of the flake in an appropriate vehicle. The nonvolatile content was 68.55% with only 0.05%, by weight, being retained on a 325-Tyler mesh sieve. The resultant product showed the following characteristics after being subjected to the indicated test:
 Leafing Characteristics
  ASTM D480: 0%
  mineral spirits: none
  Xylene: trace
 Nitrocellulose Lacquer Drawdowns
  Gloss, 60° = 28
  Total reflectance = 58
 Gray Enamel Sprayout
  Gloss, 60° = 32
  Total reflectance = 104
 Thin Coat Gray Enamel Sprayout
  The dried finish had a nonagglomerated, nongrainy appearance.

Two additional mill runs were made using the same equipment operated under the same conditions to demonstrate the effect of milling time, using the following formulations and parameters:

| | Medium | Medium Fine |
|---|---|---|
| atomized aluminum (lb) | 900 | 1100 |
| isostearic acid* (lb) | 36 | 44 |
| oleic acid** (lb) | 27 | 33 |
| mineral spirits*** | 137 | 142 |
| ball charge (lb; 5/16 average) | 30,000 | 30,000 |
| time (hr) | 3 | 5 |
| rpm | 31 | 31 |
| screen mesh (Tyler) | 160 | 250 |

*Emery ® 871 sold by Emery Industries, Inc., Cincinnati, OH
**Neofat ® 9404 sold by Armak Industrial Chemicals Division, Chicago, Illinois
***Amsco ® Mineral Spirits 75 sold by Union Oil Company of California.

In each run the entire product passed the indicated screen and was filtered to recover a presscake which was adjusted to about 65% nonvolatiles with mineral spirits. Two percent lauric acid by weight (based on the metal content) was added to enhance dispersability of the flake. The resultant products showed the following characteristics after being subjected to the indicated tests:

| Medium | | Medium Fine | |
|---|---|---|---|
| % Retained on 325 Tyler Mesh Screen | | | |
| 0.96% | | 0.31% | |
| Leafing Characteristics | | | |
| ASTM D480 | 0% | ASTM D480 | 0% |
| mineral spirits | none | mineral spirits | none |
| xylene | trace | xylene | trace |
| Nitrocellulose Lacquer Drawdown | | | |
| Gloss, 60° | = 30 | Gloss, 60° | = 44 |
| Total reflectance | = 61 | Total reflectance | = 60 |
| Thin Coat Gray Enamel Sprayout | | | |
| good appearance; slight graininess due to coarseness of pig- | | good appearance no graininess; | |

-continued

| Medium | Medium Fine |
|---|---|
| ment; no agglomeration | no agglomeration |

This example shows that, in accordance with accepted "leaf milling" techniques, use of isostearic acid milling agent yields comparable nonleafing products, each of which exhibits good tinting strength, hiding and dispersability characteristics.

EXAMPLE IV

In this example, three grades of "dry" nonleafing aluminum flake pigments were produced for use in a coating composition of the instant invention using a commercial ball mill: Formulation A—extra fine, Formulation B—medium fine and Formulation C—medium. The formulations in Table 1 resulted in the yields and characteristics in Table 2.

TABLE 1

|  | Extra-Fine Formulation A | Med. Fine Formulation B | Medium Formulation C |
|---|---|---|---|
| atomized aluminum powder (lbs.) | 90.0 | 120.0 | 130.0 |
| isostearic acid* (lbs.) | 4.5 | 4.5 | 5.0 |
| oleic acid** (lbs.) | 2.5 | 2.25 | 2.5 |
| mineral spirits*** (gals.) | 15 | 16 | 18 |
| ball charge (lbs.) 5/16" diam. ave. | 6000 | 6000 | 6000 |
| milling time (hrs.) | 4 | 3 | 2¾ |
| rpm | 46 | 46 | 46 |
| screen, mesh (Tyler) | 250 | 250 | 160 |

*Emery ® 871 sold by Emery Industries, Inc., Cincinnati, OH
**Neofat ® 9404 sold by Armak Industrial Chemicals Division, Chicago, Illinois
***Amsco ® Mineral Spirits 75 sold by Union Oil Company of California

TABLE 2

|  | Formulation A | Formulation B | Formulation C |
|---|---|---|---|
| yield | 100% | 100% | 100% |
| non-volatile (%) | 73.2 | 75.8 | 76.0 |
| leaf (%) (ASTM D480) | 0 | 0 | 0 |
| +325 mesh at 65% nonvolatiles | .12 | .43 | 1.68 |

Formulations B and C were then dried to produce a dry flake product. The dry flake from presscakes of Formulations B and C as well as the "dedusted" dry flake from Formulation B were combined with the constituents shown in Table 3. The resultant mixtures were then placed in a Stokes steam jacketed vacuum drier for the length of time indicated. After drying, the mixtures were screened and tested, the results of such tests being indicated in Table 4.

TABLE 3

|  | Formulation B (dry flake) | Formulation B (dedusted) | Formulation C |
|---|---|---|---|
| Formulaltion B (lb.) (75.8% nonvolatiles) | 500 | — | — |
| Formulation B - dedusted (lb.) (75.8% nonvolatiles) | — | 500 | — |
| DuPont Teflon ® K (g) | — | 229 | — |
| Formulation C (lb.) (76.0% nonvaltiles) | — | — | 600 |
| isostearic acid (lb.) | 7.5 | 7.5 | 9 |

TABLE 3-continued

|  | Formulation B (dry flake) | Formulation B (dedusted) | Formulation C |
|---|---|---|---|
| aluminum pellets (lb.) | 1000 | 1000 | 1000 |
| drying time (hr.) | 4.5 | 4.5 | 3.5 |
| screen, mesh (Tyler) | 100 | 10 | 80 |

TABLE 4

|  | Formulation B (dry flake) | Formulation B (dedusted) | Formulation C |
|---|---|---|---|
| leaf, % (ASTM D480) | 0 | * | 0 |
| +325 mesh, % at 99.5% nonvolatiles | 0.45 | * | 1.24 |

*webbing of Teflon ® flake particles precludes anymeaningful evaluation of physical properties This example shows fine grade aluminum flake pigments that can be used in coatings in accordance with the invention.

EXAMPLE V

In this example two commercially available aluminum flake pigment materials of equivalent grade were mixed with isostearic acid in various percentages to determine the effect on flake which has been milled in accordance with conventional techniques and milling agents.

First a nonleafing aluminum flake was admixed with isostearic acid. To seven 250 g. samples of commercially available nonleafing aluminum flake material milled with oleic acid (MD 3100 sold by Alcan Aluminum Corporation, Cleveland, Ohio 44101) was added isostearic acid in weight percentages as shown in Table V. Each sample was thoroughly admixed on a laboratory roller in a metal container for fifteen minutes. A portion of each sample was then subjected to the ASTM D480 leafing test as well as screening through a 325 mesh (Tyler) seive with the following results:

TABLE 5

| Sample # | % of Isostearic Acid | Leaf % | Material +325 |
|---|---|---|---|
| 1 | 0 | 0 | 9.76 |
| 2 | 0.1 | 0 | 8.50 |
| 3 | 1 | 0 | 5.56 |
| 4 | 2 | 0 | 6.06 |
| 5 | 3 | 0 | 7.34 |
| 6 | 4 | 0 | 7.55 |
| 7 | 5 | 0 | 6.46 |

The addition of the isostearic acid did not appear to affect the leafing (nonleafing) characteristics of the flake material. The addition of the isostearic acid may have slightly increased the dispersibility of the pigment material as indicated by the decrease in the amount of flake remaining on the 325 mesh sieve.

A leafing aluminum flake was then admixed with isostearic acid. To seven 250 g. samples of commercially available leafing aluminum flake material milled with stearic acid (MD 7100 sold by Alcan Aluminum Corporation, Cleveland, Ohio 44101) was added isostearic acid in weight percentages as shown in Table 6. The same equipment was used and techniques and tests performed as in the case of the nonleafing flake with the following results:

TABLE 6

| Sample # | % of Isostearic Acid | Leaf % | Material on +325 Sieve |
|---|---|---|---|
| 1 | 0 | 33 | 6.93 |
| 2 | 0.1 | 27 | 6.89 |
| 3 | 1 | 32 | 5.18 |
| 4 | 2 | 35 | 3.96 |
| 5 | 3 | 28 | 3.66 |
| 6 | 4 | 24 | 1.93 |
| 7 | 5 | 28 | 3.25 |

As can be seen from the table, addition of isostearic acid had little effect on the leafing characteristics of the sample flake. The dispersibility again was slightly enhanced as evidenced by the decreasing amount of material remaining on the 325 mesh sieve.

This example shows that the subsequent addition of isostearic acid after milling has substantially no effect on leafing (or nonleafing) characteristics of conventionally milled flake, i.e. not milled in the presence of an isostearic acid milling agent.

EXAMPLE VI

In this example isostearic acid was added to a commercially available nonleafing pigment milled in the presence of oleic acid to show the effect of post addition of isosteric on agglomerative characteristics.

The extra fine pigment produced in accordance with the invention in Example IV (Formulation A) was compared with a commercially available pigment of equivalent grade. The commercial material (Formulation D) was a nonleafing aluminum flake, produced with oleic acid milling agent (MDE 796 sold by Alcan Aluminum Corporation, Cleveland, Ohio 44101). Samples of both formulations were first "washed" with petroleum ether, then dried on a vacuum pump to remove any free fatty acids or additives. Isostearic acid was then added to the dry powder in the amount indicated in Table 7. Each sample was thoroughly admixed on a laboratory roller in a metal container for 15 minutes. The samples were checked initially, after 24 hours and after 72 hours for agglomeration and seediness. The results are indicated in Table 7.

TABLE 7

| Formualtion | Agglomeration and Seediness | | |
|---|---|---|---|
| % isostearic acid | Initial | 24 hours | 72 hours |
| A (0%) | none | trace | trace |
| D (0%) | none | trace | moderate |
| D (0.1%) | none | trace | slight |
| D (1%) | none | trace | severe |
| D (2%) | none | none | severe |
| D (3%) | none | none | severe |
| D (4%) | none | trace | severe |
| D (5%) | none | trace | severe |

As can be seen from the table, subsequent addition of isostearic acid to a commercially prepared nonleafing material appears to accelerate the agglomeration.

EXAMPLE VII

In this example the pigments of Example IV were compared with commercially available pigments of equivalent grade and opacity. In all cases the Gray Enamel Sprayout procedure was used to produce test panels.

Formulation A was compared with Alcoa 2290 (sold by Aluminum Company of America, Pittsburgh, Pa.), Reynolds LSB-36 (sold by Reynolds Metals Co., Richmond, Va.) and Silberline 7000AR (sold by Silberline Manufacturing Co., Inc., Lansford, Pa.). All four pigments are classified by ASTM D-962 as Type 4, Class A (0.1% maximum +325 mesh).

Formulation B was compared with Alcoa 221 (sold by Aluminum Company of America, Pittsburgh, Pa.) and Reynolds 30LN (sold by Reynolds Metals Company, Richmond, Va.). All three pigments are classified by ASTM D-962 as Type 4, Class B (1.0% maximum +325 mesh).

Formulation C was compared with Silberline Stamfor O (sold by Silberline Manufacturing Company, Inc., Lansford, Pa.). While Formulation C (1.0% maximum +325 mesh) is considered to be the coarsest of the three pigments prepared in Example IV, it nevertheless is borderline as to classification by ASTM D-962 standards, Class B having a 1.0% maximum +325 mesh and Class C ranging from 1.0% to 11.0%. In this example, Formulation C was compared with a Class B pigmented coating of equivalent hiding.

The panels were then inspected and compared for brightness. The finish on the panels coated with the pigmented material of the instant invention were definitely brighter than the panels prepared with the prior art samples.

EXAMPLE VIII

Eight coating formulations were prepared as described below using a nonleafing aluminum pigment in accordance with the invention. To standard industrial binder-solvent mixtures was added the indicated weight percent of aluminum paste comprised of nonleafing aluminum flake milled with isostearic acid. Compatability of flake with the binder-solvent mixture and ease of dispersability of the flake were comparable to competitive commercially available nonleafing aluminum flake pigments.

| Formulation 1 - automotive type topcoat | | |
|---|---|---|
| Material | % by wt. | Tradename and Supplier (if applicable) |
| aluminum paste | 1.77 | |
| toluene | 22.64 | |
| alkyd resin | 59.05 | Beckosol 1307-50; Reichhold Chemicals, Inc. |
| urea formaldehyde accelerator | 16.54 | Beckamine 3555-60; Reichhold Chemicals, Inc. |

| Formulation 2 - alkyd acrylic air dry general purpose spray enamel | | |
|---|---|---|
| Material | % by wt. | Tradename and Supplier (if applicable) |
| aluminum paste | 6.0 | |
| toluene | 56.0 | |
| alkyd compatible acrylic ester resin | 28.0 | Acryloid B-99(50); Rohm & Haas |
| polyester resin | 10.0 | Amberlac 2924; Rohm & Haas |

| Formulation 3 - acrylic air dry general purpose spray enamel | | |
|---|---|---|
| Material | % by wt. | Tradename and Supplier (if applicable) |
| aluminum paste | 6.0 | |

-continued

Formulation 3 - acrylic air dry general purpose spray enamel

| Material | % by wt. | Tradename and Supplier (if applicable) |
|---|---|---|
| toluene | 82.70 | |
| acrylic ester resin | 11.30 | Acryloid B-66 (50); Rohm & Haas |

Formulation 4 - vinyl based primer

| Material | % by wt. | Tradename and Supplier (if applicable) |
|---|---|---|
| aluminum paste | 7.42 | |
| toluene | 7.95 | |
| xylene | 5.10 | |
| naphtha | 1.46 | VM&P naptha; Exxon |
| methyl acetate solvent | 50.60 | Methyl Cellusolve Acetate; Union Carbide |
| methyl ethyl ketone | 7.2 | |
| vinyl chloride acetate | 14.60 | VAGH Vinyl; Union Carbide |
| gelling agent | 4.15 | Bentone 38; N.L. Industries |
| dioctyl phthalate | 1.52 | Nuoplaz DOP, Tenneco |

Formulation 5 - thermal acrylic baking automotive spray

| Material | % by wt | Tradename and Supplier (if applicable) |
|---|---|---|
| aluminum paste | 1.3 | |
| xylene | 11.5 | |
| aromatic solvent | 11.5 | Aromatic 100; Exxon |
| thermo acrylic resin | | PPG 550-1023; PPG Industries |

Formulation 6 - nitrocellulose lacquer spray

| Material | % by wt. | Tradename and Supplier (if applicable) |
|---|---|---|
| aluminum paste | 6.0 | |
| nitrocellulose lacquer | 56.40 | Sterling Lacquer #1088; Sterling Lacquer |
| lacquer thinner | 37.60 | T-28; Sterling Lacquer |

Formulation 7 - high temperature silicone paint

| Material | % by wt. | Tradename and Supplier (if applicable) |
|---|---|---|
| aluminum paste | 28.1 | |
| xylene | 7.6 | |
| silicone | 45.0 | #805; Dow Corning |
| silicone | 19.3 | #806A; Dow Corning |

Formulation 8 - vinyl toluene hydrocarbon spray

| Material | % of wt. | Tradename and Supplied (if applicable) |
|---|---|---|
| aluminum paste | 6.0 | |
| toluene | 75.2 | |
| copolymer of vinyltoluene/ alpha-methyl styrene monomers | 18.8 | Piccotex 75; Pennsylvania Industrial Chemical Corp. |

EXAMPLE IX

In this example the inventive coating compositions described in Example VIII were compared to similar formulations using commercially available nonleafing pigments of comparable grade.

Pigments prepared in accordance with the invention of medium grade (prepared in Example IV, Formulation C) and extra fine grade (prepared in Example IV, Formulation A) were compared with corresponding, commercially available non-leafing pigments (as a control). The pigments prepared in Example IV, however, had a median particle size distribution approximately 12% less (finer) than the corresponding control composition. The commercial grade pigments were prepared in accordance with standard non-leafing milling techniques in the presence of oleic acid milling agent. These commercial grade materials contain stabilizers to retard agglomeration while those prepared in Example IV (isosteric acid milling agent) did not. The medium grade, commercially available nonleafing pigment is designated Control 1 (MDE 586 sold by Alcan Aluminum Company, Cleveland, OH 44101) while the extra fine grade, commercially available non-leafing pigment is designated Control 2 (MDE 796 sold by Alcan Aluminum Company, Cleaveland, OH 44101).

Eight coating formulations were prepared as described in Example VIII using each of the four pigments (supplied in paste form) and applied, for test purposes, according to the indicated method of application.

The coating produced and tested were compared for general appearance and seediness. The formulations described in Example VIII were prepared for each of the four pigments approximately 48 hours before the initial application to the test panels. The coating was applied either by air spraying using a Binks handheld spray gun or by brushing with a one-inch china bristle brush as indicated in Table 8. In some cases the panels were sprayed an additional three passes in order to achieve a film of sufficient thickness to be tested. Subsequent tests were made by preparing test panels to ascertain comparative stability of the pigments.

TABLE 8

| Sample No. | Aluminum paste (wt %) | Type of Coating Vehicle | Method of Application |
|---|---|---|---|
| 1 | 1.77 | automotive-type topcoat | sprayout |
| 2 | 6.00 | alkyd-acrylic air dry general purpose enamel | thin film sprayout |
| 3 | 6.00 | acrylic air dry general purpose enamel | sprayout |
| 4 | 7.42 | vinyl-based primer | brushout |
| 5 | 1.30 | thermal acrylic baking automotive spray | sprayout |
| 6 | 6.00 | nitrocellulose lacquer spray | sprayout |
| 7 | 28.10 | high temperature silicone paint | brushout |
| 8 | 6.00 | vinyl toluene hydro carbon spray | thin film sprayout |

Samples in accordance with Table 8 for the four pigments to be tested were applied to test panels according to the method of application indicated. gloss (60°) and total reflectance were compared for each applied coating sample for each pigment as initially applied to the panel and as applied after one week (the one week tests being performed in order to determine (1) room temperature (25° C.) stability of the coating and (2) oven temperature (50° C.) stability of the coating). A range was established for each formulation for each pigment specifying the high and low values for 60° gloss and total reflectance. In each case the formulations in accordance with the invention without stabilizer were comparable to formulations using the control (I and II) pigments which contained stabilizer. Formulations A and C, with median diameter of the particle size distribution approximately 12% finer than the corresponding control composition had greater hiding (opacity) yet performed comparably with regard to total reflectance and gloss.

This example shows that the coatings of the instant invention have greater hiding power than comparable coatings having substantially similar 60° gloss and total reflectance. Non-agglomeration characteristics of the coatings of the instant invention (without stabilizer) are comparable to commercial coatings containing stabilizers.

EXAMPLE X

Each of the formulations in Table 8 (for each pigment) was applied to a test panel in accordance with the method indicated. Panels were prepared initially i.e. immediately after formulation of the coating material. At the end of a one week storage period (both at room (25° C.) and oven temperature (50° C.)) test panels were again prepared. The coatings containing the commercial pigments contained stabilizers.

In the initial tests and both the room and oven temperature one-week tests, no seediness or agglomeration of pigment of samples 1, 2, 3, and 5 was observed. For the remaining batches, seediness observed initially (I) and at one-week room (R) and at one-week oven (O) temperatures is indicated in Table 9, wherein N indicates none; S, slight, M, moderate; and V, very severe seediness:

TABLE 9

| Sample # | | Control I | Formulation C | Control II | Formulation A |
|---|---|---|---|---|---|
| 4 | I | N | N | N | N |
|   | R* | N | N | N | N |
|   | O* | M | N | M | N |
| 6 | I | N | N | M | N |
|   | R | N | N | V | N |
|   | O | N | N | ** | N |
| 7 | I | N | N | N | N |
|   | R | M | N | M | N |
|   | O | M | N | M | N |
| 8 | I | M | M | S | M |
|   | R | V | M | S | M |
|   | O | V | V | S | M |

*brushout application
**not applied - could not spray

These tests show that in all cases (except Sample 8 Formulation A) the coatings of the instant invention were equal to or better than the control coatings in respect to the characteristics of seediness and agglomeration.

While the invention has been explained in relation to its preferred embodiment, it is to be understood that various modifications thereof will become apparent to those skilled in the art upon reading the specification and is intended to cover such modifications as fall within the scope of the appended claims:

What is claimed is:

1. A pigmented coating composition comprising a vehicle comprising a film-forming binder and a substantially nonleafing aluminum flake pigment produced by reducing aluminum to flake in the presence of a milling agent comprising isostearic acid.

2. A composition as defined in claim 1, wherein said milling agent further comprises other nonleafing milling agents.

3. A composition as defined in claim 2, wherein said other agent is an unsaturated fatty acid.

4. A composition as defined in claim 3, wherein said unsaturated fatty acid is oleic acid.

5. A composition as defined in claim 4, wherein said oleic acid is present during milling in a weight not more than about 3% of the weight of aluminum present.

6. A composition as defined in claim 4, wherein oleic acid and isostearic acid are present during milling in amounts respectively between about 1.5% and about 3% and between about 3% and about 7% of the weight of aluminum present.

7. A composition as defined in claim 3, wherein the weight of isostearic acid present during milling is equal to between about 3% and about 7% of the weight of aluminum present, and wherein the other nonleafing milling agent is an unsaturated fatty acid present during milling in a weight equal to between about 1.5% and about 3% of the weight of aluminum present.

8. A composition as defined in claim 1, wherein the weight of isostearic acid present during milling is equal to between about 3% and about 7% of the weight of the aluminum flake present.

9. A composition as defined in claim 1, wherein the aluminum is reduced to flake in the presence of an isostearic acid milling agent and in the presence of a liquid wet-milling vehicle.

10. A composition as defined in claim 9, where the wet-milling vehicle is removed from the flake pigment to provide a dry powder pigment.

11. A pigmented coating composition comprising a vehicle comprising a film forming binder and a substantially nonleafing aluminum flake pigment produced by wet-milling particulate aluminum to flake form in the presence of a milling agent comprising about 3% to about 7% by weight of isostearic acid and about 1.5% to about 3% by weight of oleic acid, each based upon the aluminum content and a wet-milling vehicle to provide aluminum flake pigment.

12. A pigmented coating composition for application to a substrate comprising
   a vehicle comprising a film forming binder and
   an amount of a substantially nonleafing aluminum flake pigment dispersed in said vehicle and comprising aluminum flake particles having a surface layer comprising isostearic acid milling agent residue, effective to pigment the coating composition after application to said substrate, said surface layer being established by reducing aluminum to said flake particles in the presence of a milling agent comprising isostearic acid.

13. The pigmented coating composition of claim 12 wherein said vehicle further comprises a liquid solvent.

14. In a pigmented coating composition for topical application to a substrate, comprising a vehicle comprising a film-forming binder and a substantially non-leafing aluminum flake pigment produced by milling particulate aluminum to flake form in the presence of a milling agent, the improvement which comprises using a milling agent comprising isostearic acid.

15. A composition according to claim 14, wherein said milling is performed in accordance with leaf-milling techniques.

16. A composition according to claim 14, wherein the weight of isostearic acid present during milling is equal to between about 3% and about 7% of the weight of the aluminum present.

17. A composition according to claim 14, wherein the milling agent further comprises an amount of another nonleafing milling agent effective to substantially eliminate residual leafing.

18. A composition according to claim 17, wherein the weight of isostearic acid present during milling is equal to between about 3% and about 7% of the weight of aluminum present, and wherein the other nonleafing milling agent is an unsaturated fatty acid present during milling in a weight equal to between about 1.5% and about 3% of the weight of aluminum present.

19. A composition according to claim 18, wherein the unsaturated fatty acid is oleic acid.

20. A composition according to claim 15, wherein the leaf milling is performed in the presence of a liquid wet-milling vehicle.

21. A composition according to claim 20, wherein the wet-milling vehicle is removed from the flake pigment after leaf milling, to provide a dry powder pigment.

22. In a pigmented coating composition for topical application to a substrate, comprising a vehicle comprising a film-forming binder and a substantially non-leafing aluminum flake pigment comprising aluminum flake particles, the improvement which comprises said aluminum flake particles having a surface layer comprising isostearic acid milling agent residue, said surface layer being established by reducing aluminum to said flake particles in the presence of a milling agent comprising isostearic acid.

23. A composition as defined in claim 22, wherein said milling agent residue further comprises other nonleafing milling agent residue.

24. A composition as defined in claim 23, wherein said other agent residue is an unsaturated fatty acid residue.

25. A composition as defined in claim 24, wherein said unsaturated fatty acid residue is an oleic acid residue.

26. A composition as defined in claim 25, wherein said oleic acid milling agent residue is formed in the presence of a weight of oleic acid during milling which is not more than about 3% of the weight of aluminum present.

27. A composition as defined in claim 25, wherein said milling agent residue is formed in the presence of oleic acid and isostearic acid during milling in amounts respectively between about 1.5% and about 3% and between about 3% and about 7% of the weight of aluminum present.

28. A pigmented coating composition comprising a vehicle comprising a film-forming binder and a substantially nonleafing aluminum flake pigment produced by leaf-milling particulate aluminum to flake form in the presence of a milling agent comprising isostearic acid.

29. A composition according to claim 28, wherein the weight of isostearic acid present during milling is equal to between about 3% and about 7% of the weight of the aluminum present.

30. A composition according to claim 28, wherein the milling agent further comprises an amount of another nonleafing milling agent effective to substantially eliminate residual leafing.

31. A composition according to claim 30, wherein the weight of isostearic acid present during milling is equal to between about 3% and about 7% of the weight of aluminum present, and wherein the other nonleafing milling agent is an unsaturated fatty acid present during milling in a weight equal to between about 1.5% and about 3% of the weight of aluminum present.

32. A composition according to claim 31, wherein the unsaturated fatty acid is oleic acid.

33. A composition according to claim 28, wherein the leaf-milling is performed in the presence of a liquid wet-milling vehicle.

34. A composition according to claim 33, wherein the wet-milling vehicle is removed from the flake pigment after leaf-milling, to provide a dry powder pigment.

35. The pigmented coating composition of claim 13, wherein said liquid solvent is a hydrocarbon based solvent.

* * * * *